US011655766B2

(12) United States Patent
Martin et al.

(10) Patent No.: US 11,655,766 B2
(45) Date of Patent: May 23, 2023

(54) AUXILIARY COMPONENT MOUNTING SYSTEM FOR GAS TURBINE ENGINES

(71) Applicant: RAYTHEON TECHNOLOGIES CORPORATION, Farmington, CT (US)

(72) Inventors: Octavio Martin, Broad Brook, CT (US); Steven M. Danley, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/492,417

(22) Filed: Oct. 1, 2021

(65) Prior Publication Data

US 2023/0105543 A1 Apr. 6, 2023

(51) Int. Cl.
*F02C 7/32* (2006.01)
*F01D 25/24* (2006.01)
*F01D 25/28* (2006.01)

(52) U.S. Cl.
CPC .............. *F02C 7/32* (2013.01); *F01D 25/243* (2013.01); *F01D 25/28* (2013.01); *F05D 2220/32* (2013.01); *F05D 2240/90* (2013.01)

(58) Field of Classification Search
CPC ... F02C 7/32; F02C 7/20; F01D 9/023; F16M 1/04; F16B 31/021; F16B 2200/506
USPC ................................. 248/674, 648, 554–557
See application file for complete search history.

(56) References Cited

U.S. PATENT DOCUMENTS

| 6,170,252 | B1 | 1/2001 | Van Duyn |
| 7,093,996 | B2 | 8/2006 | Wallace et al. |
| 8,104,736 | B2 | 1/2012 | Callaghan |
| 8,814,462 | B2 * | 8/2014 | Care ..................... F01D 21/045 411/537 |
| 9,046,041 | B2 | 6/2015 | Rejman et al. |
| 9,982,605 | B2 | 5/2018 | Robertson et al. |

(Continued)

FOREIGN PATENT DOCUMENTS

| EP | 3219961 | 9/2017 |
| EP | 3219963 | 9/2017 |

(Continued)

OTHER PUBLICATIONS

USPTO; Non-Final Office Action dated Nov. 15, 2022 in U.S. Appl. No. 17/408,138.

(Continued)

*Primary Examiner* — Gerald L Sung
*Assistant Examiner* — Rene D Ford
(74) *Attorney, Agent, or Firm* — Snell & Wilmer L.L.P.

(57) ABSTRACT

An assembly for mounting an auxiliary component to an engine case of a gas turbine engine includes a support bracket, the support bracket having a first end configured for attachment to a first flange of the engine case, a second end configured for attachment to a second flange of the engine case, and an intermediate portion located intermediate the first end and the second end; a bearing member disposed within the intermediate portion; a locator disposed within the bearing member; a first plurality of bolts configured to attach the first end of the support bracket to the first flange; a second plurality of bolts configured to attach the second end of the support bracket to the second flange; and a mechanical fuse.

15 Claims, 7 Drawing Sheets

(56) References Cited

U.S. PATENT DOCUMENTS

| | | | |
|---|---|---|---|
| 10,215,100 B2 | 2/2019 | Jiang et al. | |
| 10,247,038 B2 | 4/2019 | Kappes et al. | |
| 10,578,204 B2 | 3/2020 | Martin | |
| 11,015,698 B2 | 5/2021 | Jiang et al. | |
| 2013/0042630 A1 | 2/2013 | Muldoon et al. | |
| 2014/0084130 A1 | 3/2014 | Rejman et al. | |
| 2014/0314546 A1* | 10/2014 | Davis | F01D 21/045 |
| | | | 415/124.1 |
| 2017/0260908 A1 | 9/2017 | Jiang et al. | |
| 2017/0260909 A1* | 9/2017 | Jiang | F02C 7/32 |
| 2017/0260910 A1 | 9/2017 | Jiang et al. | |

FOREIGN PATENT DOCUMENTS

| | | |
|---|---|---|
| EP | 3287624 | 2/2018 |
| EP | 3633164 | 4/2020 |
| WO | 2007064388 | 6/2007 |
| WO | 2014100817 | 6/2014 |
| WO | 2014137575 | 9/2014 |

OTHER PUBLICATIONS

European Patent Office, European Search Report dated Jan. 10, 2023 in Application No. 22188794.6.

European Patent Office, European Search Report dated Jan. 10, 2023 in Application No. 2218889.4.

* cited by examiner

AUXILIARY COMPONENT MOUNTING SYSTEM FOR GAS TURBINE ENGINES

FIELD

The present disclosure relates generally to gas turbine engines and, more particularly, to auxiliary component mounting systems for gas turbine engines.

BACKGROUND

Gas turbine engines typically utilize a turbine fan to draw ambient air into the engine for compression and combustion by the engine. The turbine fan is shrouded by an engine casing. Various auxiliary components, such as electrical boxes, engine oil tanks, gearboxes, valves, control systems for regulating engine operations, and other components, are mounted to the engine casing. Various mounting systems mount the auxiliary components to the engine casing.

Conventional mounting systems may become subjected to a high degree of shock loading not experienced during normal engine operating conditions. For example, a high shock load may result from a fan blade out event, which occurs when a fan blade breaks off of an engine rotor body. A fan-blade out event may also result in an imbalance in the engine rotor body which may cause outward deflection and a rotor body shaft imbalance. The mounting system may not be able to withstand the high shock load of a fan blade out event, causing separation of the auxiliary components from the engine casing. Or the mounting system may transfer the high shock load to the auxiliary components, causing damage to the auxiliary components.

Auxiliary components of particular concern include the gearboxes used to drive other components of the gas turbine engine. As part of an aircraft engine design, gearboxes are subjected to competing criteria. For example, on one hand, it may be desirable to use tight-weight materials as part of the gearbox hardware in order to reduce aircraft weight. On the other hand, the gearbox materials must be sufficiently strong and durable in order to withstand various loads. Fan blade out (FBO) loads are often the limiting factor as part of a conventional gearbox design. A FBO may result in large rotor imbalance loads based on a fan blade becoming detached from a fan hub or rotor. As part of gearbox designs, mechanical fuses may be incorporated into the gearbox mounting systems. Such mechanical fuses may alleviate the need to otherwise over-design the gearbox hardware to withstand such rotor imbalance loads and to protect against a FBO event.

SUMMARY

An assembly for mounting an auxiliary component to an engine case of a gas turbine engine is disclosed. In various embodiments, the assembly includes a support bracket, the support bracket having a first end configured for attachment to a first flange of the engine case, a second end configured for attachment to a second flange of the engine case, and an intermediate portion located intermediate the first end and the second end; a bearing member disposed within the intermediate portion; a locator disposed within the bearing member; a first plurality of bolts configured to attach the first end of the support bracket to the first flange; a second plurality of bolts configured to attach the second end of the support bracket to the second flange; and a mechanical fuse.

In various embodiments, the mechanical fuse is comprised within the second plurality of bolts. In various embodiments, at least one of the second plurality of bolts includes an annular cut extending circumferentially about a radially outer portion of the at least one of the second plurality of bolts.

In various embodiments, each of the first plurality of bolts extend through the first end of the support bracket and into the first flange. In various embodiments, a first gap is positioned between the first end of the support bracket and each of the first plurality of bolts that extend through the first end of the support bracket. In various embodiments, the first gap is an annular gap extending circumferentially about a radial outer surface of each of the first plurality of bolts. In various embodiments, the first gap is configured to permit back and forth radial movement, with respect to a central axis extending through the engine case, between the first end of the support bracket and the engine case following an overload event and the fracturing of each of the second plurality of bolts.

In various embodiments, a second gap is positioned between the first end of the support bracket and the first flange of the engine case. In various embodiments, the second gap is configured to permit back and forth axial movement, with respect to the central axis extending through the engine case, between the first end of the support bracket and the engine case following the overload event and the fracturing of each of the second plurality of bolts. In various embodiments, each of the second plurality of bolts includes the annular cut, thereby comprising a plurality of mechanical fuses.

In various embodiments, the second plurality of bolts includes at least one fuse bolt and at least one catch bolt, the at least one fuse bolt including an annular cut extending circumferentially about a radially outer portion of the at least one fuse bolt, and the at least one catch bolt being surrounded by an annular gap extending about a radial outer surface of the at least one catch bolt.

A gas turbine engine is disclosed. In various embodiments, the gas turbine engine includes an engine case, the engine case including a first flange and a second flange; a support bracket, the support bracket having a first end configured for attachment to the first flange of the engine case, a second end configured for attachment to the second flange of the engine case, and an intermediate portion located intermediate the first end and the second end; a bearing member disposed within the intermediate portion; a locator disposed within the bearing member; a first plurality of bolts configured to attach the first end of the support bracket to the first flange; a second plurality of bolts configured to attach the second end of the support bracket to the second flange; a mechanical fuse; and a gearbox attached to the locator. In various embodiments, the mechanical fuse is comprised within the second plurality of bolts. In various embodiments, at least one of the second plurality of bolts includes an annular cut extending circumferentially about a radially outer portion of the at least one of the second plurality of bolts.

In various embodiments, each of the first plurality of bolts extend through the first end of the support bracket and into the first flange. In various embodiments, a first gap is positioned between the first end of the support bracket and each of the first plurality of bolts that extend through the first end of the support bracket. In various embodiments, the first gap is an annular gap extending circumferentially about a radial outer surface of each of the first plurality of bolts. In various embodiments, the first gap is configured to permit back and forth radial movement, with respect to a central axis extending through the engine case, between the first end of the support bracket and the engine case following an overload event and the fracturing of each of the second plurality of bolts. In various embodiments, a second gap is positioned between the first end of the support bracket and the first flange of the engine case.

In various embodiments, the second plurality of bolts includes at least one fuse bolt and at least one catch bolt, the at least one fuse bolt including an annular cut extending circumferentially about a radially outer portion of the at least one fuse bolt, and the at least one catch bolt being surrounded by an annular gap extending about a radial outer surface of the at least one catch bolt.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
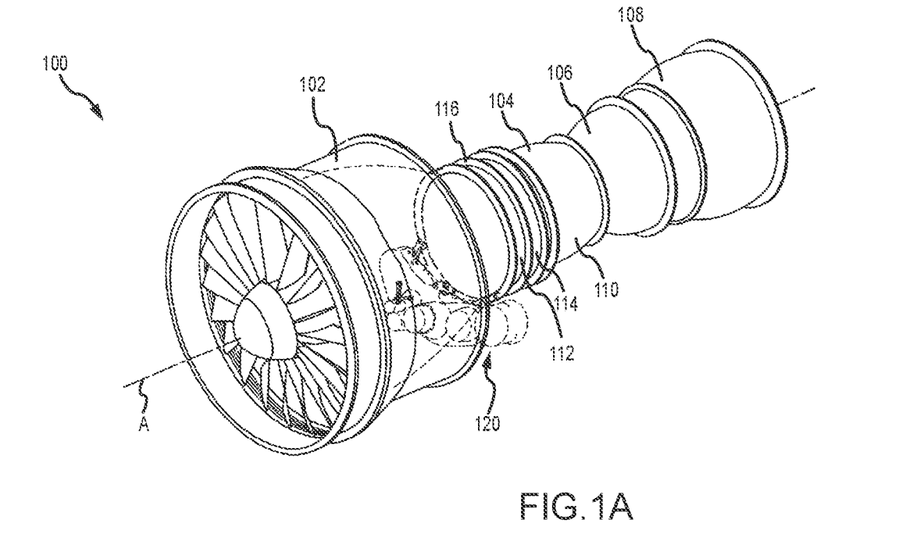
FIG. 1A provides a schematic perspective view of a gas turbine engine having a gearbox mounted to an external case of the gas turbine engine, in accordance with various embodiments.
Figure 1B:
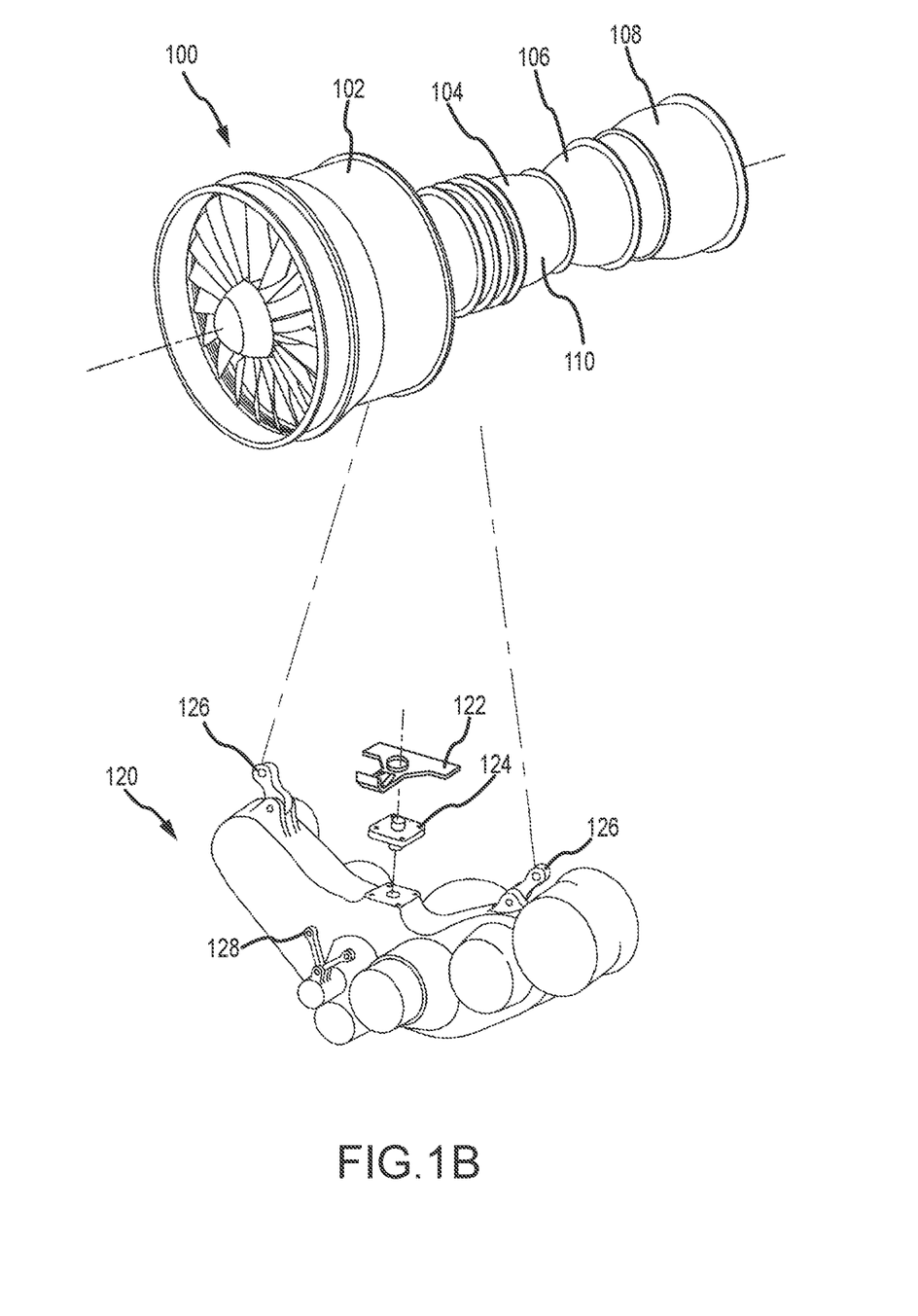
FIG. 1B provides a schematic exploded view of the gas turbine engine shown in FIG. 1A, and a gearbox mounting system for mounting the gearbox to the external case of the gas turbine engine, in accordance with various embodiments.

Referring now to the drawings, FIGS. 1A and 1B schematically illustrate a gas turbine engine 100, in accordance with various embodiments. The gas turbine engine 100 includes a fan section 102, a compressor section 104, a combustor section 106 and a turbine section 108. Typically, the compressor section 104 and the turbine section 108 each contain one or more stages that rotate about a central rotational axis A. An engine case 110 serves as a main structural support for the gas turbine engine 100 and surrounds each of the compressor section 104, the combustor section 106 and the turbine section 108. In various embodiments, the engine case 110 is constructed of individual case sections, such as a first case section 112 and a second case section 114, that are joined together at bolted flanges, such as, flange 116. A gearbox 120 is illustrated as being mounted to a forward end of the engine case 110 proximate the compressor section 104. Referring more particularly to FIG. 1B, the gearbox 120 is mounted to the engine case 110 via a support bracket 122 and a mechanical fuse 124 configured to maintain the gearbox 120 in proper alignment and position with respect to the engine case 110. In various embodiments, one or more side links 126 and a forward link 128 may also be used to mount the gearbox 120 to the engine case 110.

Figure 2A:
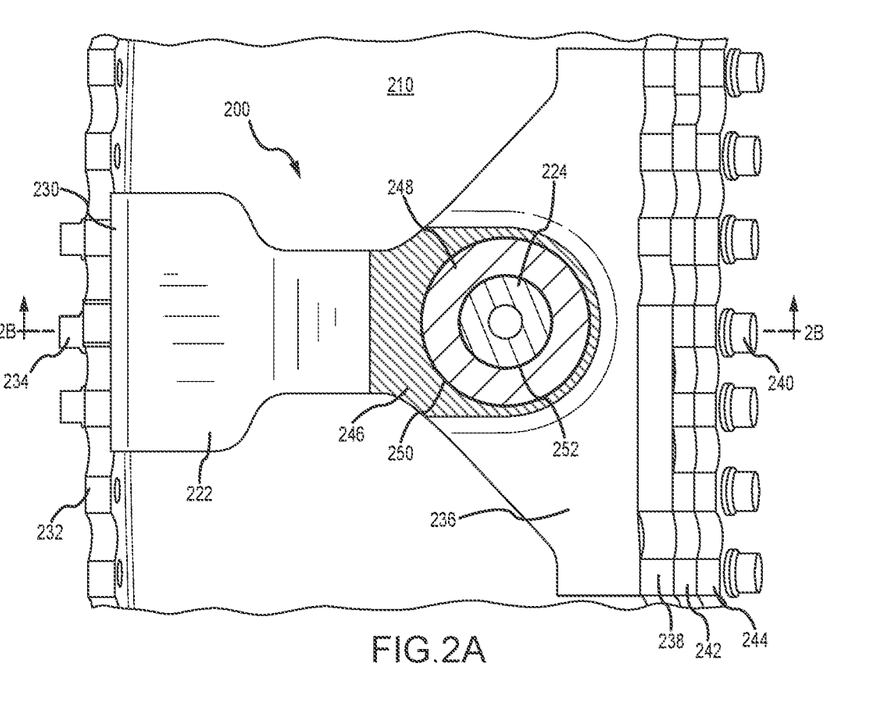
FIG. 2A provides a schematic radial view of a gearbox mounting assembly, including a support bracket and a locator, mounted to a portion of an engine case, in accordance with various embodiments.
Figure 2B:
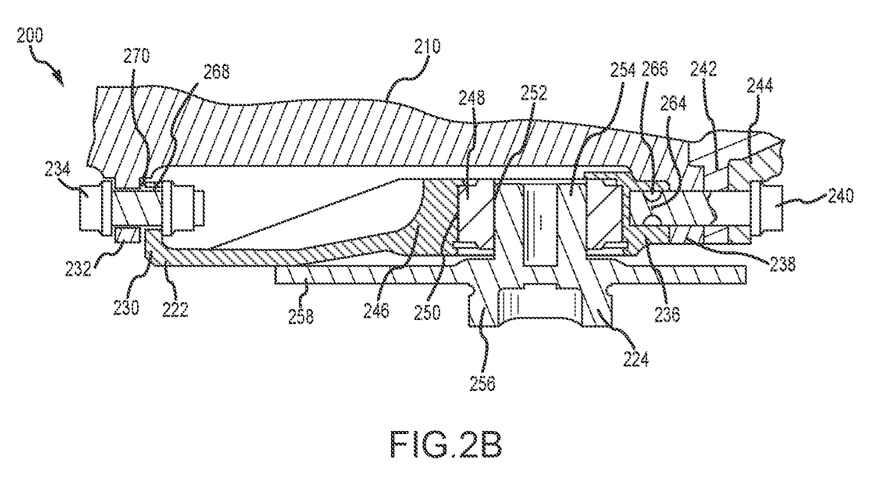
FIG. 2B provides a schematic side view of the gearbox mounting assembly shown in FIG. 2A, in accordance with various embodiments.

Referring now to FIGS. 2A and 2B schematic radial and side views, respectively, of a gearbox mounting assembly 200 mounted to a portion of an engine case 210 are illustrated, in accordance with various embodiments. The gearbox mounting assembly 200 includes a support bracket 222 and a locator 224. In various embodiments, the support bracket 222 includes a first end 230 configured for connection to a first flange 232 of the engine case 210 via a first plurality of bolts 234 and a second end 236 configured for connection to a second flange 238 of the engine case 210 via a second plurality of bolts 240. In various embodiments, the second end 236 of the support bracket 222 may also be connected to additional flanges. For example, where the engine case 210 is a high-pressure compressor case, the second flange 238 may be positioned adjacent to an inner diffuser case flange 242 and an outer diffuser case flange 244. The support bracket 222 also includes an intermediate portion 246 located intermediate the first end 230 and the second end 236 and configured to support a bearing member 248 (e.g., a spherical bearing). In various embodiments, the bearing member 248 may be press fit into a first cylindrical aperture 250 that extends into or through the intermediate portion 246 of the support bracket 222. Similarly, the support bracket 222 includes a second cylindrical aperture 252 into which a first member 254 (e.g., a first cylindrical member) of the locator 224 may be positioned and secured (e.g., via press fit). A second member 256 (e.g., a second cylindrical member) of the locator 224 in configured for insertion into an aperture extending into a casing of an auxiliary component (e.g., the gearbox 120 illustrated in FIGS. 1A and 1B). In various embodiments, the locator 224 also includes a plate member 258 (see FIG. 2B) that may be mounted to the casing of the auxiliary component (e.g., a casing of the gearbox 120).

Referring more particularly to FIG. 2B, a mechanical fuse 264 may be incorporated into at least one of the second plurality of bolts 240. The mechanical fuse 264 is configured to break or fracture a portion of the corresponding bolt in the event of a FBO, for example, such that the auxiliary component (e.g., the gearbox 120) remains attached to the engine case 210. The mechanical fuse 264 extends through a portion of at least one of the second plurality of bolts 240 and is formed by an annular cut 266 that extends circumferentially about the radially outer portion of the at least one of the second plurality of bolts 240; in various embodiments, however, the annular cut 266 extends circumferentially about the radially outer portion of each of the second plurality of bolts, thereby comprising a plurality of mechanical fuses. Because of the annular cut 266, the mechanical fuse 264 that results provides a localized region that is designed to fracture during an overload event, such as a FBO, where the overload is typically applied in an axial direction with respect to a central axis extending along the length of each of the first plurality of bolts 234 and the second plurality of bolts 240. As illustrated, in various embodiments, the mechanical fuse 264 defines a diameter that is typically less than a nominal diameter of a shank portion of the members of the second plurality of bolts 240.

To accommodate movement of the support bracket 222 following an overload event and the fracturing of each of the second plurality of bolts 240, a first gap 268 (or an annular gap) is positioned between the first end 230 of the support bracket 222 and a radial outer surface of each of the first plurality of bolts 234 that extend through the first end 230 of the support bracket 222. The first gap 268 permits back and forth radial movement (with respect to the central rotational axis A described above) between the first end 230 of the support bracket 222 and the engine case 210 following an overload event and the fracturing of each of the second plurality of bolts 240. In addition, a second gap 270 may be positioned between the first end 230 of the support bracket 222 and the first flange 232 of the engine case 210. The second gap 270 permits back and forth axial movement (with respect to the central rotational axis A described above) between the first end 230 of the support bracket 222 and the engine case 210 following an overload event and the fracturing of each of the second plurality of bolts 240. In various embodiments, the first gap 268 has a radial extent within a range of about one millimeter (1 mm) to about five millimeters (5 mm). In various embodiments, the second gap 270 has an axial extent within a range of about one millimeter (1 mm) to about five millimeters (5 mm).

While the first gap 268 and the second gap 270 permit axial and radial movement between the support bracket 222 and the engine case 210 following the fracturing of each of the second plurality of bolts 240, the first plurality of bolts 234 and the first end 230 of the support bracket 222 are configured to maintain the support bracket 222 in place, together with the auxiliary component, following the overload event. In various embodiments, this may be accomplished by maintaining sufficient loading (or tightening via corresponding threaded nuts) on each of the first plurality of bolts 234 to keep the second gap 270 between opposing faces of the first end 230 of the support bracket 222 and the first flange 232 a sufficient distance that prevents the second end 236 of the support bracket 222 from rotating away from the engine case 210 following the fracturing of each of the second plurality of bolts 240. In various embodiments, this may be further accomplished by maintaining any gap occurring between the second end 236 of the support bracket 222 and the second flange 238 a sufficient small distance that prevents the second end 236 of the support bracket 222 from rotating away from the engine case 210 following the fracturing of each of the second plurality of bolts 240.

In various embodiments, the cross-sectional area of the mechanical fuse 264 positioned in each of the first plurality of bolts 260 is determined based on an ultimate strength calculated to be less than a predicted load expected during the overload event. As an example, the cross-sectional area of the sum of the mechanical fuses among the first plurality of bolts may be determined using the criteria P/A=Ultimate Strength of the sum of mechanical fuses, where P is equal to a percentage value less than the predicted overload—and low enough that the supported hardware survives the overload event, but high enough to ensure that no subsequent impacts exceed P—and A is equal to the cross-sectional area of the sum of the mechanical fuses. In various embodiments, for example, P is equal to a value within a range of 10% to 95% of the predicted overload; or, in various embodiments, P is equal to a value within a range of 25% to 90% of the predicted overload; or, in various embodiments, P is equal to a value within a range of 50% to 80% of the predicted overload; or, in various embodiments, P is equal to about 75% of the predicted overload.

Figure 3A:
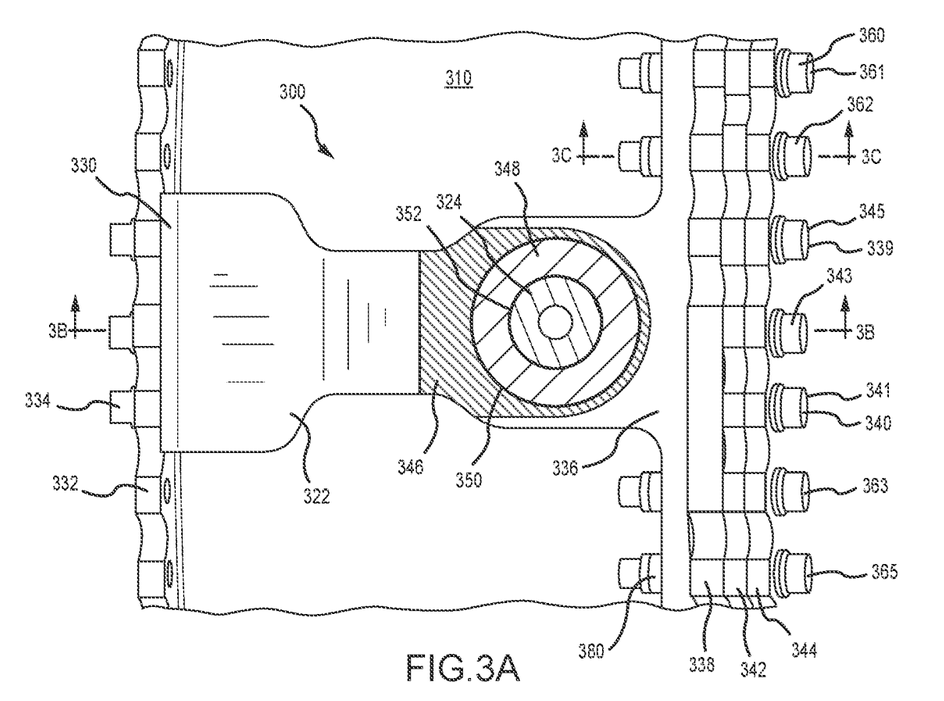
FIG. 3A provides a schematic radial view of a gearbox mounting assembly, including a support bracket and a locator, mounted to a portion of an engine case, in accordance with various embodiments.
Figure 3B:
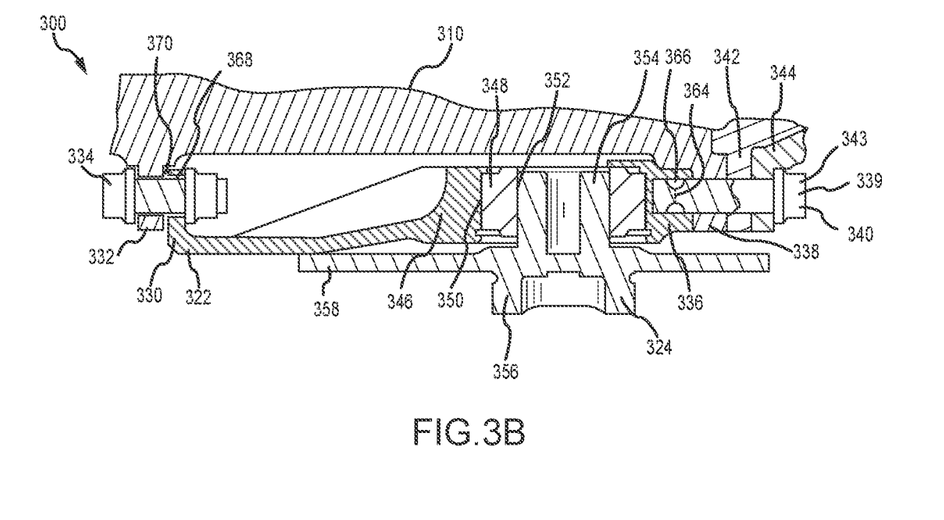
FIG. 3B provides a schematic side view of a portion of the gearbox mounting assembly shown in FIG. 3A, in accordance with various embodiments.
Figure 3C:
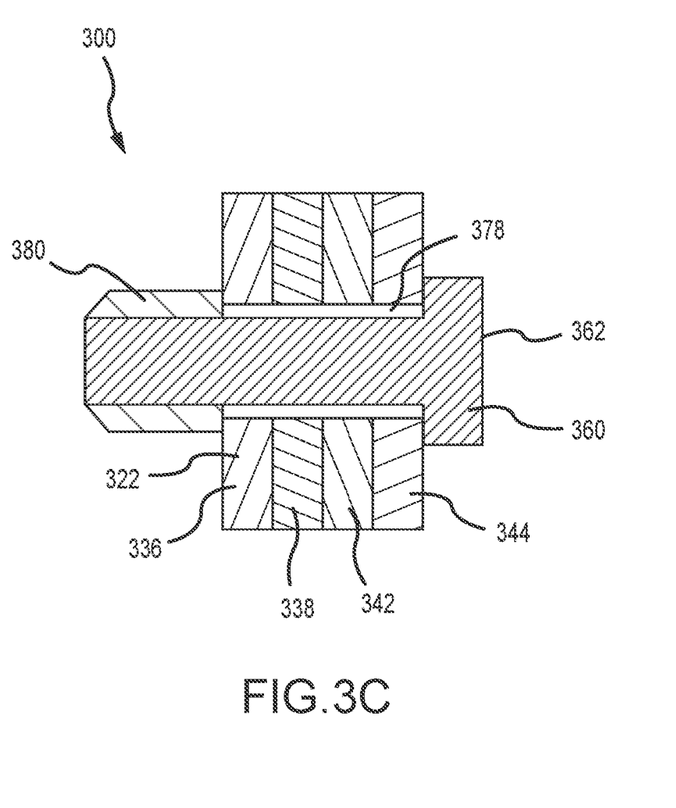
FIG. 3C provides a schematic side view of a portion of the gearbox mounting assembly shown in FIG. 3A, in accordance with various embodiments.

Referring now to FIGS. 3A, 3B and 3C, schematic radial and side views of a gearbox mounting assembly 300 mounted to a portion of an engine case 310 are illustrated, in accordance with various embodiments. The gearbox mounting assembly 300 includes a support bracket 322 and a locator 324. In various embodiments, the support bracket 322 includes a first end 330 configured for connection to a first flange 332 of the engine case 310 via a first plurality of bolts 334 and a second end 336 configured for connection to a second flange 338 of the engine case 310 via a second plurality of bolts 240. In various embodiments, the second end 336 of the support bracket 322 may also be connected to additional flanges. For example, where the engine case 310 is a high-pressure compressor case, the second flange 338 may be positioned adjacent to an inner diffuser case flange 342 and an outer diffuser case flange 344. The support bracket 322 also includes an intermediate portion 346 located intermediate the first end 330 and the second end 336 and configured to support a bearing member 348 (e.g., a spherical bearing). In various embodiments, the bearing member 348 may be press fit into a first cylindrical aperture 350 that extends into or through the intermediate portion 346 of the support bracket 322. Similarly, the support bracket 322 includes a second cylindrical aperture 352 into which a first member 354 (e.g., a first cylindrical member) of the locator 324 may be positioned and secured (e.g., via press fit). A second member 356 (e.g., a second cylindrical member) of the locator 324 in configured for insertion into an aperture extending into a casing of an auxiliary component (e.g., the gearbox 120 illustrated in FIGS. 1A and 1B). In various embodiments, the locator 324 also includes a plate member 358 (see FIG. 3B) that may be mounted to the casing of the auxiliary component (e.g., a casing of the gearbox 120).

Referring more particularly to FIG. 3B, a mechanical fuse 364 may be incorporated into at least one of the second plurality of bolts 340 (or at least one of a plurality of fuse bolts 339). In various embodiments, for example, the mechanical fuse 364 may be incorporated into a first fuse bolt 341, a second fuse bolt 343 and a third fuse bolt 345. The mechanical fuse 364 is configured to break or fracture a portion of the corresponding bolt in the event of a FBO, for example, such that the auxiliary component (e.g., the gearbox 120) remains attached to the engine case 310. The mechanical fuse 364 extends through a portion of at least one of the second plurality of bolts 340 and is formed by an annular cut 366 that extends circumferentially about the radially outer portion of the at least one of the second plurality of bolts 340 (e.g., the first fuse bolt 341, the second fuse bolt 343 and the third fuse bolt 345). Because of the annular cut 366, the mechanical fuse 364 that results provides a localized region that is designed to fracture during an overload event, such as a FBO, where the overload is typically applied in an axial direction with respect to a central axis extending along the length of each of the first plurality of bolts 334 and the second plurality of bolts 340. As illustrated, in various embodiments, the mechanical fuse 364 defines a diameter that is typically less than a nominal diameter of a shank portion of the members of the plurality of fuse bolts 339.

To accommodate movement of the support bracket 322 following an overload event, a plurality of catch bolts 360 (e.g., a first catch bolt 361, a second catch bolt 362, a third catch bolt 363 and a fourth catch bolt 365) is configured to catch (or to hold substantially in place) the support bracket 322 following fracture of one or more members of the plurality of fuse bolts 339. As illustrated in FIG. 3C, a first gap 378 (or a first annular gap) is positioned between a radial inner surface of each of the second end 336 of the support bracket 322 and the second flange 338 (and, if present, the inner diffuser case flange 342 and the outer diffuser case flange 344) and a radial outer surface of each of the plurality of catch bolts 360. The first gap 378 permits radial movement (with respect to the central rotational axis A described above) between the second end 336 of the support bracket 322 and the engine case 310 following an overload event and the fracturing of each of the plurality of fuse bolts 339. Note that in contrast to the plurality of fuse bolts 339, which are typically threaded into the second end 336 of the support bracket 322, each of the plurality of catch bolts 360 is fastened into place via a nut 380 or similar fastener. In various embodiments, the first gap 378 has an axial extent within a range of about one millimeter (1 mm) to about five millimeters (5 mm).

To further accommodate movement of the support bracket 322 following an overload event and the fracturing of each of the plurality of fuse bolts 339, a second gap 368 (or a second annular gap) is positioned between the first end 330 of the support bracket 322 and a radial outer surface of each of the first plurality of bolts 334 that extend through the first end 330 of the support bracket 322. The second gap 368 permits back and forth radial movement (with respect to the central rotational axis A described above) between the first end 330 of the support bracket 322 and the engine case 310 following an overload event and the fracturing of each of the plurality of fuse bolts 339. In addition, a third gap 370 may be positioned between the first end 330 of the support bracket 322 and the first flange 332 of the engine case 310. The third gap 370 permits back and forth axial movement (with respect to the central rotational axis A described above) between the first end 330 of the support bracket 322 and the engine case 310 following an overload event and the fracturing of each of the plurality of fuse bolts 339. In various embodiments, the second gap 368 has a radial extent within a range of about one millimeter (1 mm) to about five millimeters (5 mm). In various embodiments, the third gap 370 has an axial extent within a range of about one millimeter (1 mm) to about five millimeters (5 mm).

In various embodiments, the cross-sectional area of the mechanical fuse 364 positioned in each of the plurality of fuse bolts 339 is determined based on an ultimate strength calculated to be less than a predicted load expected during the overload event. As an example, the cross-sectional area of the sum of the mechanical fuses among the plurality of fuse bolts 339 may be determined using the criteria P/A=Ultimate Strength of the sum of mechanical fuses, where P is equal to a value less than the predicted overload—and low enough that the supported hardware survives the overload event, but high enough to ensure that no subsequent impacts exceed P—and A is equal to the cross-sectional area of the sum of the mechanical fuses. In various embodiments, for example, P is equal to a value within a range of 10% to 95% of the predicted overload; or, in various embodiments, P is equal to a value within a range of 25% to 90% of the predicted overload; or, in various embodiments, P is equal to a value within a range of 50% to 80% of the predicted overload; or, in various embodiments, P is equal to about 75% of the predicted overload.

Various benefits of the foregoing disclosure may be realized. For example, the various embodiments provide a manner to maintain the axial degree of freedom of the locator in place by limiting movement of the support bracket to small distances in the radial and the axial directions following an overload event. The various embodiments also provide a manner of maintaining the bearing element (typically a spherical bearing) in its proper position and orientation following an overload event.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above-described concepts can be used alone or in combination with any of or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An assembly for mounting an auxiliary component to an engine case of a gas turbine engine, comprising:
   a support bracket, the support bracket having a first end configured for attachment to a first flange of the engine case, a second end configured for attachment to a second flange of the engine case, and an intermediate portion located intermediate the first end and the second end;
   a bearing member disposed within the intermediate portion;
   a locator disposed within the bearing member;
   a first plurality of bolts configured to attach the first end of the support bracket to the first flange;
   a second plurality of bolts configured to attach the second end of the support bracket to the second flange; and
   a plurality of mechanical fuses comprised within the second plurality of bolts, each of the second plurality of bolts including an annular cut extending circumferentially about a radially outer portion of each of the second plurality of bolts.

2. The assembly of claim 1, wherein the second plurality of bolts includes at least one catch bolt, the at least one catch bolt being surrounded by an annular gap extending about a radial outer surface of the at least one catch bolt.

3. The assembly of claim 1, wherein each of the first plurality of bolts extend through the first end of the support bracket and into the first flange.

4. The assembly of claim 3, wherein a first gap is positioned between the first end of the support bracket and each of the first plurality of bolts that extend through the first end of the support bracket.

5. The assembly of claim 4, wherein the first gap is an annular gap extending circumferentially about a radial outer surface of each of the first plurality of bolts.

6. The assembly of claim 5, wherein the first gap is configured to permit back and forth radial movement, with respect to a central axis extending through the engine case, between the first end of the support bracket and the engine case following an overload event and the fracturing of each of the second plurality of bolts.

7. The assembly of claim 6, wherein a second gap is positioned between the first end of the support bracket and the first flange of the engine case.

8. The assembly of claim 7, wherein the second gap is configured to permit back and forth axial movement, with respect to the central axis extending through the engine case, between the first end of the support bracket and the engine case following the overload event and the fracturing of each of the second plurality of bolts.

9. A gas turbine engine, comprising:
   an engine case, the engine case including a first flange and a second flange;
   a support bracket, the support bracket having a first end configured for attachment to the first flange of the engine case, a second end configured for attachment to the second flange of the engine case, and an intermediate portion located intermediate the first end and the second end;
   a bearing member disposed within the intermediate portion;
   a locator disposed within the bearing member;
   a first plurality of bolts configured to attach the first end of the support bracket to the first flange;

a second plurality of bolts configured to attach the second end of the support bracket to the second flange;
a plurality of mechanical fuses comprised within the second plurality of bolts, each of the second plurality of bolts including an annular cut extending circumferentially about a radially outer portion of each of the second plurality of bolts; and
a gearbox attached to the locator.

10. The gas turbine engine of claim 9, wherein the second plurality of bolts includes at least one catch bolt, the at least one catch bolt being surrounded by an annular gap extending about a radial outer surface of the at least one catch bolt.

11. The gas turbine engine of claim 9, wherein each of the first plurality of bolts extend through the first end of the support bracket and into the first flange.

12. The gas turbine engine of claim 11, wherein a first gap is positioned between the first end of the support bracket and each of the first plurality of bolts that extend through the first end of the support bracket.

13. The gas turbine engine of claim 12, wherein the first gap is an annular gap extending circumferentially about a radial outer surface of each of the first plurality of bolts.

14. The gas turbine engine of claim 13, wherein the first gap is configured to permit back and forth radial movement, with respect to a central axis extending through the engine case, between the first end of the support bracket and the engine case following an overload event and the fracturing of each of the second plurality of bolts.

15. The gas turbine engine of claim 14, wherein a second gap is positioned between the first end of the support bracket and the first flange of the engine case.

\* \* \* \* \*